Figure 1:
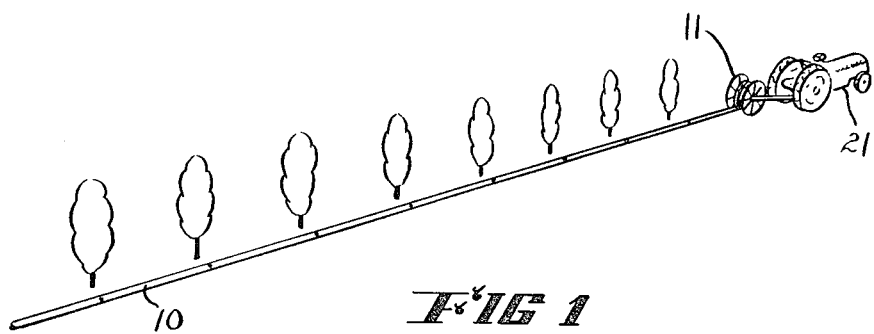

United States Patent

[11] 3,632,048

[72] Inventor John Lloyd Light
 Happy Valley, Australia
[21] Appl. No. 862,379
[22] Filed Sept. 30, 1969
[45] Patented Jan. 4, 1972
[73] Assignee David James Hendry
 Hawthorndene, Australia
 a part interest

[54] IRRIGATION HOSE
6 Claims, 9 Drawing Figs.

[52] U.S. Cl................................................ 239/547,
 239/581
[51] Int. Cl........................................... B05b 15/00
[50] Field of Search............................... 239/547,
 581

[56] References Cited
UNITED STATES PATENTS
1,964,097 6/1934 Van Doren.................... 239/547

| | | | |
|---|---|---|---|
| 2,145,451 | 1/1939 | McCoy.......................... | 239/547 |
| 2,196,456 | 4/1940 | Charroin....................... | 239/547 X |
| 2,628,865 | 2/1953 | Duncan......................... | 239/547 X |
| 2,721,764 | 10/1955 | Wilson ......................... | 239/547 X |

FOREIGN PATENTS
928,690   6/1963   Great Britain................   239/547

*Primary Examiner*—M. Henson Wood, Jr.
*Assistant Examiner*—Edwin D. Grant
*Attorney*—Oldham & Oldham ABSTRACT: An irrigation hose system for trickle irrigation of plants wherein the trickle metering device is constituted by an insert driven insert driven into an aperture in the hose wall, and the insert contains an adjusting screw which, upon adjustment, varies the rate of discharge, thus enabling a constant irrigation rate for all plants even if the hose lies on undulating terrain.

PATENTED JAN 4 1972 3,632,048

SHEET 1 OF 4

Inventor:
John Lloyd Light
By:
Oldham & Oldham
Attys.

PATENTED JAN 4 1972 3,632,048

SHEET 3 OF 4

Inventor:
John Lloyd Light
By: Oldham & Oldham
Attys.

IRRIGATION HOSE

This invention relates to an irrigation hose system which is useful for the irrigating of fruit trees, vines, glasshouse plants or other irrigable vegetation.

Fruit trees, vines and the like are currently irrigated by either the flood or the sprinkler methods, but neither of these are completely satisfactory. If the flood method is used the amount of water placed on the ground is excessive and the ground eventually becomes damaged, due to salinity and other factors. To overcome these problems it has become customary to employ sprinklers, but sprinklers are undesirable for several reasons. If high-salt-content water is used the foliage should not be wetted, and this then makes necessary the use of low trajectory sprinklers, but these have limited throw. Furthermore for a sprinkler to be effective it is necessary to have a considerable pressure available, and this is also costly. In addition, considerable evaporation will take place if a sprinkler is used, both while the droplets are passing through the air and after they contact the ground. A sprinkler will water a wide area, and thus encourage growth of competitive vegetation.

The main object of this invention is to provide an improved irrigation hose where many of these disadvantages are considerably reduced, and the invention may in one of its forms consist of an irrigation hose having a series of apertures through its sidewall at spaced intervals, inserts in respective apertures, and adjustment members in respective inserts adjustable to control flow rate of irrigating water discharging from the hose and through the inserts. If the apertures are spaced at approximately the same spacing as the vines or trees of a plantation, then the water can be delivered adjacent the butt of a vine or tree, and the area watered can thereby be limited. This reduces the encouragement to competitive vegetation, for example weeds, between the vines or trees. It also reduces loss due to evaporation, and in making a most effective use of the water, reduces the amount of water which needs to be placed on the ground thereby reducing the possibility of damage to the ground. By simply adjusting the adjustment means, the rate of flow can be regulated to ensure each tree or vine receives sufficient water.

The invention also eliminates danger of the leaves becoming wetted by water having a high salt content.

Figure 2:
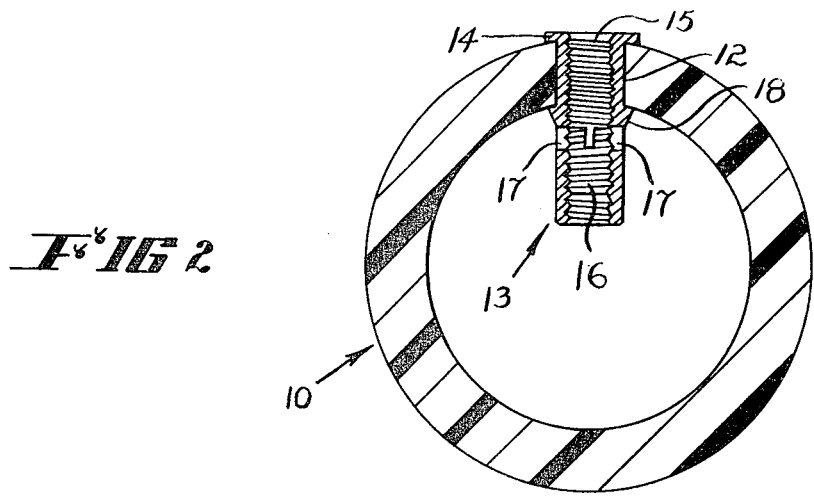
Figure 3:
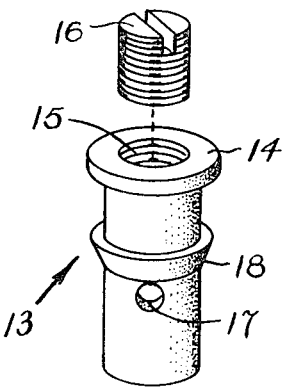
Figure 4:
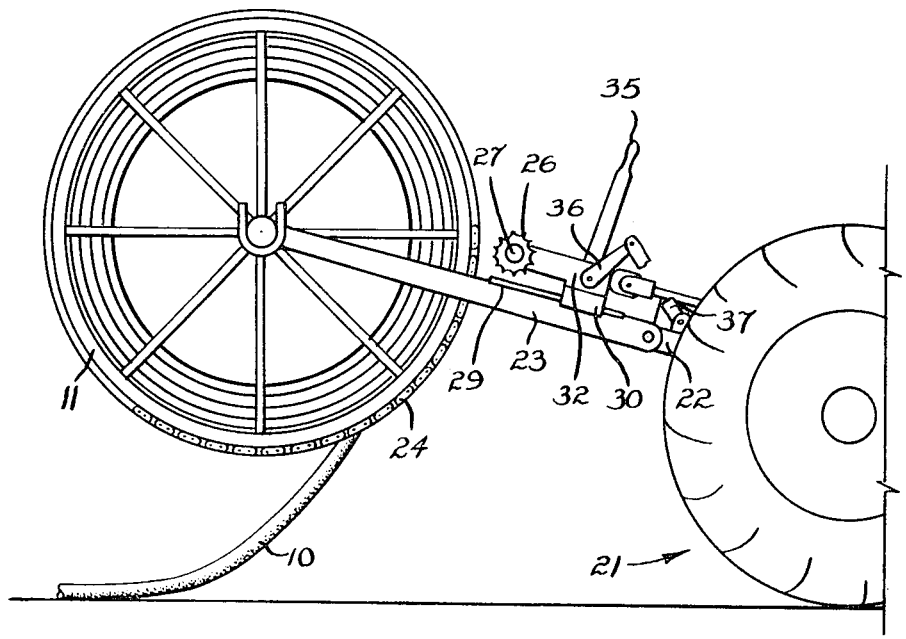
Figure 5:
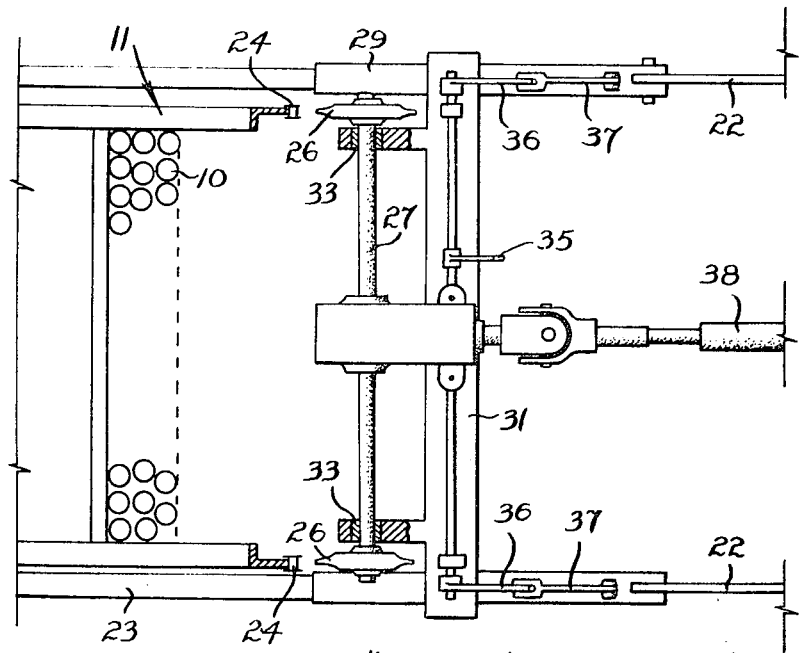
Figure 6:
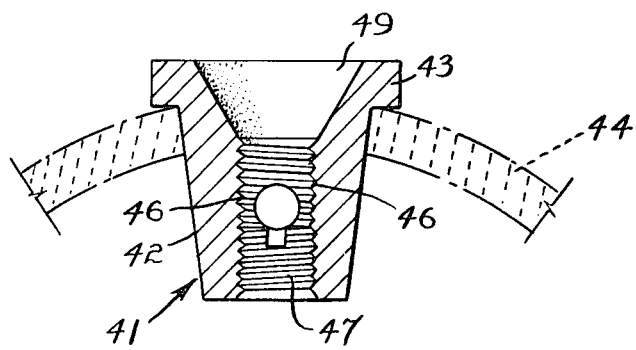
Figure 7:
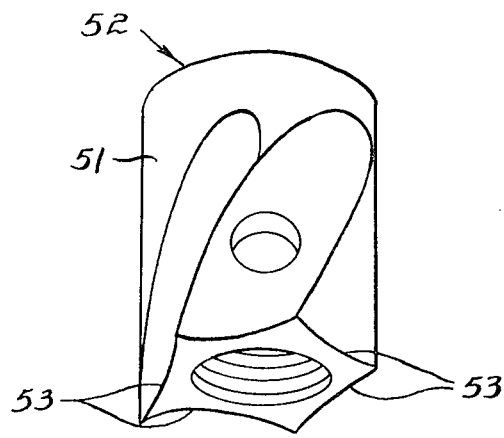
Figure 8:
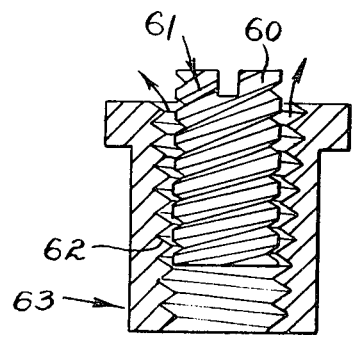
Figure 9:
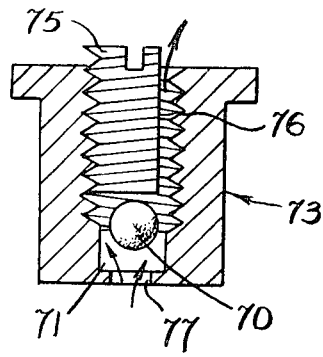

Embodiments of the invention are described herein in some detail with reference to and are illustrated in the accompanying drawings, in which:

FIG. 1 is a perspective view showing use of an irrigating hose in the irrigating of a row of trees, FIG. 2 is a section through a hose showing an insert in an aperture therein, the insert containing an adjustment member, FIG. 3 is a perspective "exploded" view of an insert and its adjustment member, FIG. 4 is a side elevation of a power-driven reel carried by a tractor, and supporting the hose, FIG. 5 is a partly sectioned plane view of FIG. 4, FIG. 6 shows an insert in a metal tube, according to a second embodiment, FIG. 7 shows an insert according to a third embodiment, also for insertion in an aperture in a metal tube, FIG. 8 is a section through an insert according to a fourth embodiment, and FIG. 9 is a corresponding section according to a fifth embodiment.

According to the first embodiment a hose 10 is formed from semirigid thermoplastics materials, in this embodiment polyethylene, but polyvinylchloride or other polymeric material is suitable. The hose 10 is arranged to be transported on a tractor mounted reel 11, and the wall of the hose is provided with a plurality of spaced apertures 12, each aperture containing a tubular insert 13 projecting into the hose 10. Each insert 13 is provided with a flange 14 at its outer end, but its inner wall is threaded at 15 and contains an adjusting screw 16, the sidewall of the insert 13 containing a water flow aperture 17 arranged so that by adjusting the screw 16 the effective dimension of the water flow aperture 17 can be in turn adjusted. A flange 18 on the outer wall of the insert 13 reduces the danger of accidental dislodgment.

In use the hose is coiled onto the power-driven reel 11 carried on the rear end of a tractor 21, and the tractor 21 is driven along a row of trees to "run out" the hose as shown in FIG. 1, with each aperture aligned approximately with the butt of a tree. The adjustment screws 16 are then adjusted so that the flow rate is approximately even over the length of the hose, and water is run through the hose to discharge at the localities of the trees. At this time the tractor can be conveniently left at the end of a row, but when the row has been watered, the reel is driven to roll up the hose, whereupon the tractor is positioned alongside a further row and the operation is repeated.

Referring in detail to FIGS. 4 and 5, the tractor 21 is provided with three point linkage arms 22 which support a rearwardly extending frame 23 itself rotationally supporting the reel 11. The two rims of the reel 11 each have secured to them a respective chain 24, and complementary sprockets 26 on the ends of a shaft 27 are movable into or out of engagement with the chains 24. To achieve this action, the frame 23 is provided with guide plates 29 engaged by guides 30 on a slide 31, which has on it a gearbox 32, of which the shaft 27 is the output shaft. This shaft is journaled in bearings 33 also carried on the slide 31. The slide is moved back and forth by a handle 35 which rocks arms 36 coupled by links 37 to the frame 23. Drive is from the power takeoff of the tractor through telescopic drive shaft 38 provided with universal joints at its ends. If power takeoff is not available, a separate engine may be used.

When the sprockets engage the chains, the power takeoff may be started to reel in the hose.

The invention is not limited to a polymeric resin based hose, but may extend to a metal pipe.

In FIG. 6 an insert 41 is provided with a tapered shank 42 and an upper flange 43, and is driven into a metal pipe 44, the taper ensuring a firm interference fit so that danger of dislodgment is small. The insert inner wall 46 is threaded and receives an adjusting screw 47 which adjusts the effective area of an aperture 48 through the insert sidewall, as in the first embodiment. The outer end of the inner wall 47 is chamfered at 49 to allow the insert to function as a spray jet if that is required.

FIG. 7 shows a further variation wherein the outer walls 51 of the insert 52 are formed to provide helically extending edges 53 to firmly engage the walls of a metal pipe or other type of hose.

The fourth embodiment of FIG. 8 employs a screw 60 having a "flat top" thread 61, that is, the thread root diameter is standard but its outer diameter is less than standard with respect to the common triangular section thread. This screw engages a female thread 62 in the insert 63, the female thread 62 having a standard "V" section, but tapering to a smaller diameter at its inner end. Thus the effective water flow metering path between the threads can be varied by simply advancing or retracting the screw 60, even if that screw is of nonresilient material, the water flow path being bounded in part by the flat top of the thread 61.

In some instances it may not be practicable to effectively filter the water to be discharged through the inserts, which may therefore tend to block. In the fifth embodiment of FIG. 9, a ball 70 (conveniently of polymeric plastics material) is contained within a well 71 in the base of an insert 73, the annular space between the ball and the walls of the well constituting an effective water flow metering path. However the female thread is of larger diameter than the well, so that as the ball moves into the space bounded by the thread, water flow increases. This positioning of the ball is regulated by a screw 75 which is adjustable in the thread, the screw 75 having a flat side 76 to allow water to pass the screw 75. Water enters the insert through the aperture 77 in the base of the well 71.

During such time as water flows, pressure will retain the ball 70 against the lower end of the screw 75. However release of pressure will allow the ball to "float" within the well, so that repositioning of the ball will frequently occur as a tap is turned off. This then provides an automatic self-cleaning feature which reduces tendency to block.

What I claim is:

1. An irrigation hose having a series of apertures through its sidewall at spaced intervals, inserts in respective apertures, each insert comprising a hollow member containing a female thread and projecting into the hose, a flow aperture extending through the sidewall of each insert within the hose, a screw threadably engaging said thread below the flow aperture and rotatable to thereby adjust the effective dimension of the flow aperture, and a flange at the outer end of each insert.

2. An irrigation hose according to claim 1 further comprising a further flange around the shank of each insert and is spaced from the outer end thereof by an amount at least equal to the hose wall thickness.

3. An irrigation hose according to claim 1 wherein the shank of each insert is of frustoconical shape.

4. An irrigation hose according to claim 1 wherein the hose is of resin based polymeric material.

5. An irrigation hose according to claim 4 further comprising a hose reel, tractor mounting means supporting the hose real, and drive means coupled to the hose reel but releasable therefrom.

6. An irrigation hose as in claim 1 where the hose is adapted to dispense water with an accurately controlled flow rate and said screw can be adjusted by a member inserted into said hollow member.

* * * * *